Sept. 10, 1968      R. L. BALKE ET AL      3,400,454
METHOD OF MAKING ENCAPSULATED ELECTRICAL MEMBERS
Original Filed March 29, 1963
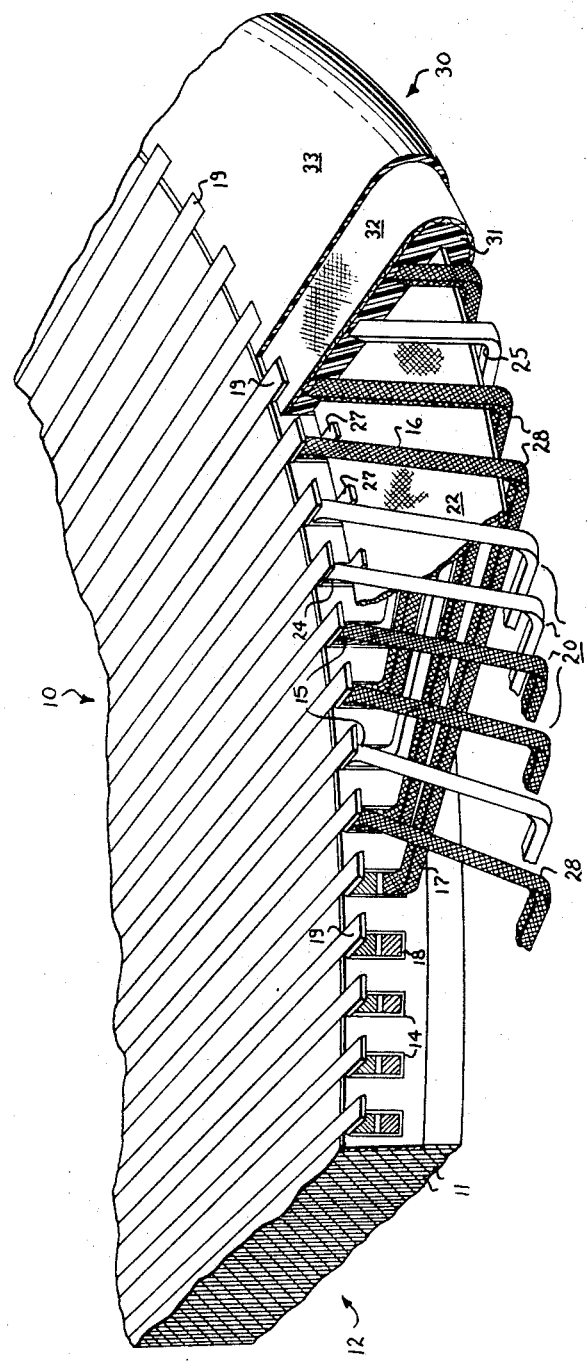
INVENTORS
ROY L. BALKE
JAMES T. DUANE
BY
THEIR ATTORNEY

United States Patent Office 3,400,454
Patented Sept. 10, 1968

3,400,454
METHOD OF MAKING ENCAPSULATED ELECTRICAL MEMBERS
Roy L. Balke and James T. Duane, Erie, Pa., assignors to General Electric Company, New York, N.Y., a corporation of New York
Original application Mar. 29, 1963, Ser. No. 269,033, now Patent No. 3,242,358, dated Mar. 29, 1966. Divided and this application Dec. 27, 1965, Ser. No. 516,548
2 Claims. (Cl. 29—596)

ABSTRACT OF THE DISCLOSURE

A method of making an encapsulated electrical member wherein a protective envelope is provided for electrical windings which extend from a core of the electrical member by impregnating the windings with a thermosetting resinous dielectric composition, and at least partially curing the composition. The extending portions of the windings are covered with a thermosetting resinous dielectric composition, a strip of loosely woven fabric is imbedded into the outer surface area of this composition, and the composition is cured to complete the protective envelope.

---

This invention is related to a method of making encapsulated electrical members. This application is a division of application Ser. No. 269,033, filed Mar. 29, 1963, now U.S. Patent No. 3,242,358. Although this invention has a wide range of applications such as in the construction of various encapsulated electrical equipments, it is particularly useful in the construction of electrical members, such as stators, for dynamoelectric machines and will be particularly described in that connection.

For many applications, such as in aircraft and missiles for example, dynamoelectric machines must be provided which achieve higher and higher outputs without a corresponding increase in the size and weight thereof. In many instances this requires operating the machines at much higher temperatures as well as in environments of high ambient temperature. Many such machines designed for such high ambient temperature operation are liquid cooled so that, in addition to the usual insulation required, it is generally necessary to encapsulate the end turns of the stator to adequately protect them from the effects of the machine cooling liquid and the associated severe environmental conditions occasioned by such operation.

The concept of encapsulating the end turns of a stator to provide protection from adverse environmental conditions is not a new one and many attempts have been made in the prior art to provide such stators. While encapsulated stators constructed in accordance with prior art practices have been satisfactory for many of the more normally encountered operating conditions and environments, they have not been entirely satisfactory for use in machines subjected to the higher temperatures, higher mechanical and vibratory stresses or severe environments associated with the use of machine coolants. For example, in many applications the windings are subjected to temperatures in excess of 200° C. and are frequently splashed with, or submerged in, the machine cooling liquid.

The principal difficulties in the successful utilization of the known prior art techniques relate to the characteristics of the available encapsulating materials. For example, the presently available encapsulating resin compositions which are oil resistant and capable of withstanding high operating temperatures are rigid and, therefore, lack the elasticity to withstand the effects of thermal expansion and contraction due to thermal cycling. As a result it has been found that the encapsulating material of stators constructed in accord with the prior art techniques is subject to cracking either during the curing thereof or during machine operation.

It is an object of this invention, therefore, to provide an improved protective envelope for the end turns of a stator which substantially overcomes one or more of the prior art difficulties and utilizes the presently available rigid encapsulating resin compositions.

It is another object of this invention to provide an encapsulated stator for use in liquid cooled dynamoelectric machines which is highly resistant to cracking when subjected to thermal cycling.

Briefly stated, in accordance with one aspect of this invention, we provide a method of making an encapsulated stator for a dynamoelectric machine wherein a layer of loosely woven fabric is embedded into the outer surface region of the encapsulating composition and impregnated with such composition to provide a protective envelope which is highly resistant to the initiation and propagation of surface cracks during machine operation even though utilizing the presently available high temperature materials which are rigid.

We have further discovered, and it is upon this discovery that another aspect of this invention is predicated, that the conventional prior art phase insulation arrangement, wherein a rectangular piece of flexible sheet insulating material is disposed between the overlapped portions of the end turns with at least some of this material extending to or beyond the end turns, produces a delaminating effect to the encapsulating composition, however applied, which contributes to cracking when the stator is subjected to thermal cycling such as encountered in the curing of the encapsulating material or during machine operation.

These difficulties are overcome in accord with one aspect of this invention by employing a high temperature electrically insulating sheet material in the form of a sleeve which is disposed over the end turns of at least the coils having a phase-to-phase relationship prior to the usual impregnation of the stator assembly with a suitable high temperature dielectric material. Preferably, this phase-to-phase insulation is provided by a separate section of untreated glass cloth which is fitted over the end turns of the coils having a phase-to-phase relationship and which becomes fully impregnated with the dielectric material during the usual stator impregnating treatment to provide a phase insulation arrangement which is free from the discontinuities associated with the prior art phase insulation arrangements.

In further accord with this invention the entire end turn region of the stator has encapsulating material applied thereto to form a complete protective envelope therefor. The encapsulating material is intimately bonded to the impregnated end turns and phase insulating sections to provide a bond free from stress points. A layer of high temperature loosely woven fabric is embedded into the outer surface of the encapsulating composition and impregnated with such material to reinforce the outer surface region of the protective envelope.

The novel features believed characteristic of this invention are set forth with particularity in the appended claims. The invention itself, however, together with further objects and advantages thereof, will best be understood by reference to the following description taken in conjunction with the accompanying drawing in which the single figure is a diagrammatic, partially exaggerated sectionalized view of a portion of a stator assembly incorporating this invention.

As shown in the figure, the portion of the stator assembly, generally designated at 10, includes a plurality of laminations 11 arranged in the usual manner to form a stator core 12. The core is provided with axially extending slots 14 containing coils 15. Each of the coils 15 has a top coil side 16 and a bottom coil side 17 disposed in the coil slots in the usual manner and insulated from the slot walls by slot tubes 18. The machine shown for illustration is wound for three phase operation.

As is common practice, each coil has one side placed in the bottom of a first slot, is reversely bent forming an end turn, designated generally at 20, and re-enters the top of a second slot displaced from the first slot a number of slots determined by the winding arrangement employed. Since all of the coils are reversely bent and placed in the core in this manner, the end turns 20 thereof are in an overlapping relationship. Electrical insulation, top-to-bottom, between these overlapping end turns is provided by the rectangular strip of electrically insulating sheet material 22 inserted therebetween. Strip 22 extends in width from the end 24 of the slot tubes 18 to the inside 25 of the reverse bend of end turn 20 and extends in length essentially around the core 12. Preferably, the strip 22 is of treated glass cloth such as a glass cloth impregnated with a suitable high temperature dielectric material. An electrical insulating sheet material found suitable for this purpose is glass cloth impregnated with a polyester resin composition and sold under the designation Fabri-Therm by the General Electric Company.

Insulation between the coils disposed within the same slot is provided by the liner 27 which extends axially the entire length of the slot and exteriorly a short distance from the ends thereof as shown.

In accord with the illustrated embodiment of the present invention, phase-to-phase insulation is provided between the end turns having a phase-to-phase relationship by the sleeve 28 disposed over the entire length of such end turns. For example, sleeve 28 fits over the end turn and extends from the end of the slot tube of one slot to the end of the slot tube of the slot which the coil re-enters. Preferably, the sleeve 28 is of untreated glass cloth although a treated glass cloth sleeve may be utilized as can a sleeve of another suitable high temperature material which may be impregnated with the dielectric material during impregnation of the stator assembly in the usual manner to form an insulating covering free from discontinuities.

It will be understood that in the figure the spacing of the end turns has been greatly exaggerated to more clearly illustrate the novel phase insulation arrangement both top-to-bottom and side-to-side as well as the relationship of the encapsulating composition and the reinforcement of the outer surface region thereof. Further, the term "treated" and "untreated" glass cloth as used throughout the specification refers respectively to whether or not the glass cloth has or has not been impregnated with a suitable varnish or other dielectric resin composition and does not relate to any of the so-called cleaning or other finishing treatments utilized in the manufacture of glass cloth.

In further accord with this invention a complete protective envelope 30 is provided for the stator end turns 20 by enclosing the entire end turn region with a suitable encapsulating composition 31 which is capable, when cured, of withstanding temperatures in excess of 200° C. and which is resistant to oil or other machine cooling liquids and vapors. A layer 32 of a high temperature loosely woven fabric is embedded into and impregnated with the encapsulating composition and disposed near the outer surface region thereof to reinforce that region of the protective envelope formed by the encapsulating composition. Preferably this is a layer of an untreated loosely woven glass cloth having a mesh of at least about 1/16 inch. The layer 32 is covered by the thin surface layer 33 of the encapsulating material to form a complete protective envelope which is resistant to machine cooling liquids and vapors and, although incorporating rigid high temperature encapsulating compositions, is highly resistant to cracking when subjected to thermal cycling and severe vibrational stresses.

For less severe applications wherein the encapsulating composition may not be required to withstand such high temperature or adverse environments or where the encapsulating composition may be somewhat less rigid, the protective envelope enclosing the end turns has been found to overcome the prior art difficulties even though utilizing the former phase insulation arrangement provided the reinforcing layer refered to in the foregoing description is incorported near the outer region of the encapsulating composition. This invention, therefore, permits the use of rigid, unreinforced encapsulating resin compositions to be utilized to encapsulate electrical members and by incorporating a reinforcing layer of loosely woven fabric into only the outer surface region thereof the protective envelope is made highly resistant to both the initiation and propagation of surface cracks when the member is subjected to thermal cycling, severe environments and/or mechanical stresses.

In accordance with the method of this invention we provide a stator asembly wound in a manner well known to the art wherein the coils 15, equipped with a suitable ground insulation, are placed in each of the slots 14 on the inner peripheral surface of the stator core 12 with the end turns 20 extending exteriorly from each end thereof. A rectangular strip of electrically insulating sheet material, such as a dielectric resin impregnated glass cloth, is inserted on the inside involute of all the coil end turns and extends around essentially the entire end turn circumference. This strip, therefore, is utilized only to provide coil top-to-bottom insulation and, contrary to the prior art practices, is not inserted between and extending from the end turns having a phase-to-phase relationship in order to separate and insulate each phase group. Strip 22 lies between the overlapped portions of the coil end turns extending in width from the slot tube end to the coil "hair pin" inside, and in length around essentially the entire end turn circumference. As will be understood, the strip 22 provides coil top-to-bottom insulation and need not be a single continuous strip but may be made up, if desired, of a plurality of shorter strips suitably overlapped to provide for full top-to-bottom coil insulation and with no portion of this insulation extending exteriorly from the end turns. Again, strip 22 may be a polyester resin impregnated glass cloth such as the Alkanex polyester resin impregnated glass cloth sold by the General Electric Company under the name and designation Fabri-Therm.

Phase-to-phase insulation is then provided by employing separate sections of electrically insulating sheet material which are placed around the coil end turns which have a phase-to-phase relationship. This may be provided by employing separate sections of glass cloth sleeving over the involute of adjacent coil end turns having a phase-to-phase voltage condition. Although the sleeving may be pretreated glass cloth, it is preferred, for the higher temperature applications, to employ untreated glass cloth sleeves so that the subsequent high temperature impregnating dielectric composition can impregnate into the glass sleeve and thereafter provide a continuous compatible surface to which the encapsulating composition may more intimately bond without the creation of stress points.

After the coil top-to-bottom and separate phase-to-phase insulation materials have been placed on the stator end turns, the stator assembly is subjected to an impregnation treatment in a manner well known in the art to provide a complete covering of a hard resinous dielectric material over the coil end turns, the coil top-to-bottom and phase-to-phase insulating material as well as over and into the coil receiving slots and the coils disposed therein. This may be provided in any of the well-known prior art impregnating techniques such as successive dipping and baking, vacuum and pressure treatments, spraying, brushing and the like utilizing suitable resins or varnishes chosen to withstand the particular operating conditions to be encountered and providing that the dielectric composition is thoroughly impregnated into and provides a dielectric coating over the treated regions of the stator.

Suitable commercial high temperature impregnating compositions, for example, are the epoxylated novolac resins and the bisphenol-epichlorohydrin polymers. Examples of the latter materials are those sold under the trade name Epon 826 or 828 manufactured and sold by the Shell Chemical Company, the Araldite epoxy resins such as Araldite 6005 or 6010 which are manufactured and sold by the Ciba Company, Inc., the Epi-Rez epoxy resins, such as Epi-Rez 530 and 540 which are manufactured and sold by the Jones-Dabney Company and other well-known epoxy resins. Suitable curing agents to provide high temperature compositions, for example, are hexahydrophthalic anhydride (HHPA) and methylated maleic acid adduct of phthalic anhydride and other curing agents which are known to those skilled in the art. Further details of suitable epoxy resins, epoxylated novolac resins and the curing agents therefor may be had by reference to the book entitled "Epoxy Resins" published in 1957 by the McGraw-Hill Book Company, Inc., New York, N.Y. Different resinous compositions may require different temperatures to obtain the desired cure. One suitable epoxylated novolac resin impregnating composition, for example, was cured by baking for about four hours at a temperature of about 190° C. If desired the impregnating resin coating need not be fully cured at this time but may be only partially cured and receive its complete cure during curing of the encapsulating composition which is subsequently applied to the end turn region.

After the stator impregnating treatment and suitable cure thereof, the coil end turn region is covered with a thicker encapsulating resinous composition such as a similar epoxylated novolac or a bisphenol-epichlorohydrin polymer. This composition may be applied in any suitable manner such as by troweling, casting, or the like so as to provide a complete protective envelope. The encapsulating composition bonds intimately to the previously impregnated stator end turn region and in particular forms a bond free from any stress points at the phase-to-phase insulated regions to completely avoid any delaminating effect.

Before the encapsulating composition is cured the outer surface region thereof is reinforced by embedding a loosely woven high temperature fabric, preferably loosely woven untreated glass cloth, thereinto which becomes impregnated with the encapsulating composition forming an extremely strong layer very near the outer surface of the encapsulating material. A final finish layer of the encapsulating composition is then applied over the fabric to assure a complete coating thereover. The encapsulating composition is then cured in well-known manner by subjecting it to an elevated temperature for a predetermined time. For example, in one specific case the stator was placed in a suitable oven and baked for about two hours at a temperature of about 125° C. and for an additional 10 to 12 hours at a temperature of about 250° C.

The encapsulating electrical members formed in accordance with the principles of this invention are found to be extremely resistant to cracking when the stator is subjected to thermal cycling. By suitable selection of the encapsulating composition the envelope may be provided to withstand the required high temperature conditions which may be encountered as well as being resistant to the machine cooling liquids and vapors. Moreover the use of a layer of loosely woven fabric very near the outer surface region only of the encapsulating composition serves to make the protective envelope highly resistant to the initiation and propagation of cracks.

It is further apparent from the foregoing description that the phase insulation arrangement, having no edges extending exteriorly of the end turns, together with the reinforced outer surface region of the encapsulating composition allows for the construction of an encapsulated electrical member, particularly a stator or the like, which, when required for high temperature use must employ rigid encapsulating materials, is highly resistant to cracking when subjected to thermal cycling such as encountered during curing of the composition or during machine operation.

While only certain preferred features of this invention have been shown by way of illustration, many modifications and changes will occur to those skilled in the art. It is, therefore, to be understood that the appended claims are intended to cover all such modifications and changes as fall within the true spirit and scope of this invention.

What is claimed as new and desired to secure by Letters Patent of the United States is:

1. The method of making an electrical member for a dynamoelectric machine which comprises: providing a magnetic core having coil receiving slots therein and coils disposed in said slots having end turns placed in overlapped relationship and extending exteriorly of said core; inserting treated electrically insulating sheet material between the overlapped end turns and extending around the circumference thereof; fitting untreated glass cloth sleeves over the entire length of the end turns of at least the coils having a phase-to-phase relationship; impregnating said electrical windings, treated electrically insulating sheet material, the untreated glass cloth sleeves, the end turns and regions adjacent thereto with a thermosetting resinous dielectric composition; heating said electrical member to effect at least a partial cure of said resinous dielectric composition; covering the impregnated end turns and the regions adjacent thereto with a thermosetting resinous dielectric composition to provide a complete protective envelope therefor; embedding a loosely woven untreated glass cloth layer into only the outer surface region of said resinous dielectric composition and impregnating said glass cloth therewith; and heating said electrical member to effect a complete cure of the thermosetting dielectric composition forming said protective envelope.

2. The method of making an encapsulated electrical member which comprises: providing a magnetic core having electrical windings thereon at least a portion of which windings extend exteriorly of said core; impregnating said electrical windings and the extending portions thereof with a thermosetting resinous dielectric composition; subjecting said resinous dielectric composition to an elevated temperature to effect at least a partial cure thereof; covering the extending portions of said impregnated electrical windings and the regions adjacent thereto with a thermosetting resinous dielectric composition to provide a complete protective envelope therefor, said resinous dielectric composition comprising an epoxy resin selected from the group consisting of the epoxylated novolacs and the bisphenol-epichlorohydrin polymers and a curing agent therefor; embedding a strip of loosely woven glass cloth into only the outer surface area of said protective envelope and impregnating said cloth with the resinous dielectric composition thereof; and curing the resinous dielectric composition to provide a complete crack resistant protective envelope for the extended portions of said electrical windings.

References Cited

UNITED STATES PATENTS

| | | | |
|---|---|---|---|
| 2,473,842 | 6/1949 | Askey | 310—43 |
| 2,713,715 | 7/1955 | Jenner et al. | 29—605 |
| 2,749,460 | 6/1956 | Acton et al. | 310—260 |
| 2,959,699 | 11/1960 | Smith et al. | 310—260 |
| 3,151,262 | 9/1964 | Howard et al. | 310—260 |
| 3,242,358 | 3/1966 | Balke et al. | 310—260 X |

JOHN F. CAMPBELL, *Primary Examiner.*

C. E. HALL, *Assistant Examiner.*